United States Patent Office 2,864,555
Patented Dec. 16, 1958

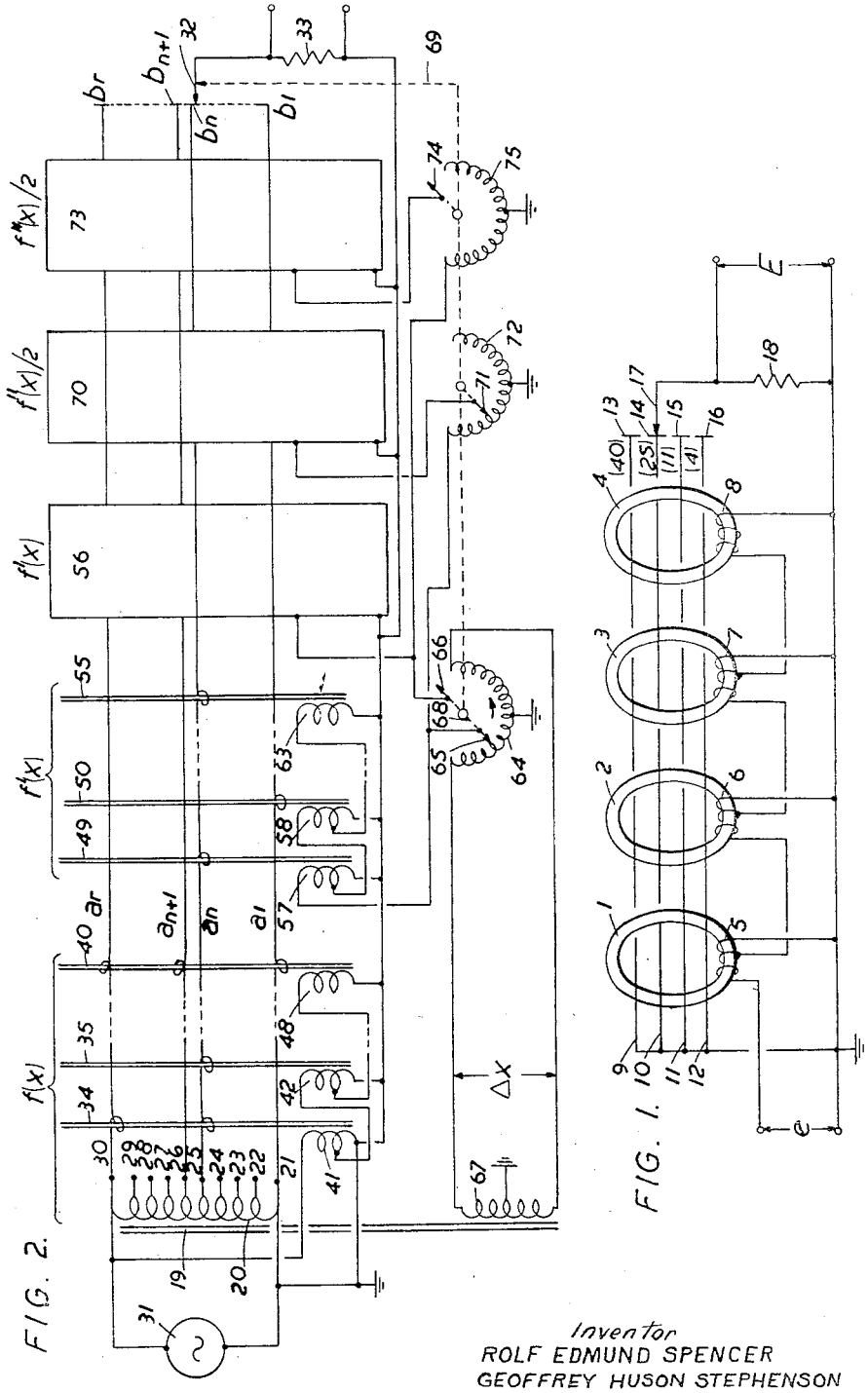

2,864,555
ANALOG FUNCTION GENERATOR

Rolf Edmund Spencer and Geoffrey Huson Stephenson, Ealing, London, England, assignors to Electric & Musical Industries Limited, Hayes, England, a company of Great Britain Application January 12, 1954, Serial No. 403,666

Claims priority, application Great Britain August 17, 1948

20 Claims. (Cl. 235—61)

This application is a continuation-in-part of our co-pending U. S. application Serial No. 110,404, filed August 15, 1949, now forfeited.

The present invention relates to apparatus for setting up electrical analogues of numbers and it relates especially but not exclusively to apparatus for setting up voltage analogues of instantaneous values of a function of an independent variable.

In computing apparatus, it is frequently required to set up voltage analogues of instantaneous values of an arbitrary function $f(x)$ of an independent variable $x$, which may be represented by the angular position of a shaft. The function $f(x)$ may be a linear or non-linear function and such voltage analogues may be required, for example, for feeding to other elements of the computing apparatus such as adders, multipliers, integrators. In one form of apparatus, the requirement is satisfied by "storing" analogues of the value of the function for different values of the independent variable and by providing selector means operated by the shaft for selecting the analogue appropriate to the instantaneous value of the independent variable. In theory, such voltage analogues can be obtained directly from tappings on a single multitap choke (inductive potentiometer) but the accuracy obtainable in this way is limited by practical considerations. For example, in some applications, an accuracy to 1 part in 10,000 may be necessary, and one part of the practical difficulties with tapped chokes is that they cannot conveniently be tapped at fractions of a turn. Therefore, to achieve an accuracy to 1 part in 10,000 would require a choke with 10,000 turns. To wind such a choke on a toroidal core (as is generally required) is almost impossible and in any case the impedance would be very much too high for many practical purposes.

One object of the present invention is to provide improved apparatus for setting up voltage analogues of numbers with a view to reducing the difficulties above described.

Another difficulty encountered with apparatus such as described above arises from the fact that the number of analogues which can be "stored" is limited by physical considerations so that values of $f(x)$ are available only for discrete values of the independent variable $x$. Therefore, for values of $x$ between said discrete values there may not be available an analogue of $f(x)$ which satisfies the accuracy requirement and to fulfill this requirement interpolation between the stored values of $f(x)$ becomes necessary.

Another object of the present invention is to provide improved means for effecting such interpolation.

In the following specification, reference is made to a digital scale of notation as the "symmetric ternary scale of notation" and it is to be understood that this is a scale of 3 in which, however, the digits available in each digital place are −1, 0 and +1 instead of 0, 1 and 2 as in the conventional scale of notation having the radix three. The scale of notation devised by the applicants is, for convenience, referred to hereinafter and in the claims as the symmetric ternary scale and, since in this scale only two numerical values 1 and 0 are available in each digital place, many advantages of utilizing the binary scale can be obtained in computing apparatus with the additional important advantage that fewer digits are required to represent given numbers. In the symmetric ternary scale the number four, for example, is expressed as +1+1 which may be abbreviated to ++ while the number twenty-five in abbreviated form is +0—+ (that is twenty-seven minus three plus one). The rules of multiplication and of addition employing the symmetric ternary scale of notation can easily be deduced and are relatively simple and moreover the rounding-off of a number to reduce the number of significant digits employed is always correctly effected by the omission of digits of lower power without modifying the value of the digits retained.

In order that the said invention may be clearly understood and readily carried into effect, the same will now be more fully described with reference to the accompanying drawing, in which:

Figure 1 illustrates the principle of the present invention and shows diagrammatically apparatus for setting up voltages representing numbers in the symmetric ternary scale of notation, and Figure 2 illustrates one application of the principle of the present invention.

Referring to the drawing the apparatus shown in Figure 1 comprises four magnetic cores 1 . . . 4 of high permeability steel and of toroidal form. An exciting winding 5 is wound on the core 1 and it has applied to it an alternating voltage of amplitude $e$ from a suitable source, not shown. The winding 5 may have any convenient number of turns, for example 30, although for convenience of illustration only three turns are shown in the drawing. The other cores 2, 3 and 4 are provided with exciting windings 6, 7 and 8 identical to the winding 5 and each connected across one third of the turns of the preceding winding as shown, so that each successive core is excited with flux variations having an amplitude which is one third of the amplitude of the flux variations with which the preceding core is excited. The core 4 is used for setting up unit digits in the symmetric ternary scale, while the cores 3, 2 and 1 are, respectively, used for setting up "threes," "nines," "twenty-sevens" digits in the aforesaid scale. It will be assumed that the apparatus of Figure 1 is required to store numbers representative of values of a function for different values of the variable of the function and, merely for the purpose of illustration, the storing of four different numbers will be described. In order to store these four different numbers, four conductors 9, 10, 11, 12, one corresponding to each number, are provided, the conductors being connected to earth at their left hand ends, laced through or past the cores 1 . . . 4 and connected at their right hand ends to switch contacts 13, 14, 15, 16. The conductor 9 is laced through all the cores 1 . . . 4 from front to rear thereof as seen in the drawing and this direction will be termed the positive direction. The conductor 10 is laced through the cores 1 and 4 in the positive direction, is laced through the core 3 in the negative direction, i. e., from rear to front, and passes the core 2 without going through it. The conductor 11 is laced positively through the cores 2 and 3 and negatively through the core 4, while the conductor 12 is laced positively through the cores 3 and 4. A contact brush 17 is movable selectively into engagement with any one of the contacts 13 . . . 16 and it is connected to earth through an output impedance 18. In the drawing, the brush 17 is shown engaging the contact 14 and a conductive path is formed by the conductor 10 and the impedance 18. It can be shown experimentally that if a conductor is looped round a toroidal core which is excited with a flux variation of predetermined amplitude, the amplitude of the alternating voltage induced by a single loop is proportional to the rate of change of flux and hence the amplitude thereof and effectively independent of the position or configuration of the conductor, while the sense of the voltage is dependent upon the direction of looping, i. e., clockwise or counterclockwise with reference to the instantaneous direction of the change of the flux. The subsequent path of the conductor after passing through the core is immaterial so that the same conductor can be passed through a succession of cores, in which case the total induced voltage is the algebraic sum of the separate voltages induced by a single loop round each of the cores. Therefore a voltage E is induced across the impedance 18 which represents the number $+0-+$ (that is $27-3+1$) in the symmetric ternary scale, i. e., representing the number 25 in the decimal scale. When the brush 17 engages the contact 13 the voltage set up across the impedance 18 represents the number $++++$, when the brush 17 engages the contact 15 the voltage E represents the number $++-$, while when the brush engages contact 16 the voltage E represents the number $++$. The corresponding numbers in the decimal scale are indicated in brackets adjacent the respective contacts 13 . . . 16. Therefore by moving the brush 17 to engage a selected one of the contacts 13 to 16, a voltage is set up across the resistance 18 representative of the value of the function for the value of the variable assigned to the corresponding one of the conductors 9 to 12. As will hereinafter appear from the description of Figure 2, the location of the contacts can be arranged to represent successive discrete values of the variable separated by the same interval, while the brush can be moved in any desired manner in response to observations of the variable so that its position is representative of the instantaneous value thereof. The decimal number 40 obtainable from the contact 17 is the highest possible in the symmetric ternary scale using four digits only. This is half the highest number obtainable with the same number of digits in the conventional ternary scale, and with any number of digits the highest number obtainable in the symmetric ternary scale is always half the highest obtainable with the conventional ternary scale. On the other hand using only four digits the highest number obtainable in the binary scale is 15 so that the symmetric ternary scale has a substantial advantage (which increases as the numbers increase) compared with the binary scale while possessing many of its advantages. It is of course possible by increasing the number of conductors laced through or past the cores 1 . . . 4 to store any whole number up to 40. If larger numbers than 40 are required the number of toroidal cores must be appropriately increased. On the other hand if a lesser degree of accuracy can be tolerated the core used for setting up the units digits, and possibly also the core used to set up the "threes" digits may be omitted with a corresponding simplification in the apparatus.

It will now be appreciated that the toroidal cores 4 to 1 are energized in such a way that flux variations are induced in the cores having successively greater amplitudes related as successive integral powers of the integer 3, the radix in the scale of notation employed, the cores corresponding to succcessive digital places. The amplitude of the flux induced in the core 3 is three times that of the flux induced in the core 4, the amplitude of the flux induced in the core 2 is three times that induced in the core 3 and the amplitude of the flux induced in the core 1 is three times that induced in the core 2 so that the amplitudes of the fluxes induced in the cores 4, 3, 2 and 1 are related as $3^0$, $3^1$, $3^2$ and $3^3$. The passage of a conductor through one of the cores 4 to 1 links the conductor once with the core and each analogue is set up in effect by linking the conductors with different combinations of the cores so as to represent the required number in the symmetric ternary scale of notation. A digit $+1$ is represented by a linkage of one polarity, that is by the passage of a conductor through the corresponding core in one sense, while a digit $-1$ is represented by a linkage of opposite polarity, that is by the passage of a conductor through the corresponding core in the opposite sense. A digit 0 is represented by the conductor passing outside the corresponding core. The linkage of each conductor once only with each core is made possible by the adoption of a scale of notation in which only two numerical values, 1 and 0, are available in each digital place, as is the case in the binary scale and the symmetric ternary scale, while the adoption of the symmetric ternary scale of notation has the advantage that the number of digits, and hence of cores, needed to obtain a desired degree of accuracy is less than if the binary scale were employed. The invention therefore enables wiring difficulties to be reduced to a minimum and possibilities of error during wiring are also lessened.

It is nevertheless to be understood that the present invention also covers the application of the conventional binary scale so as to induce analogues of numbers in the form of electro-motive forces or voltages in conductors which are laced through a system of cores. The simplicity of wiring achieved by the arrangement shown in Figure 1 is also achieved with the binary scale, since each conductor is laced only once, or not at all, through each core representing the digital places, although the number of cores will need to be increased. For example, in a modification of Figure 2, utilising the binary scale instead of the symmetric ternary scale, the windings 6, 7 and 8 are each connected across one half the number of turns of the preceding winding, so that the fluxes induced in the cores 4, 3, 2 and 1 have amplitudes related as $2^0$, $2^1$, $2^2$, and $2^3$. The maximum number which can be represented by any conductor using four cores is then only 15, but since no negative digit values exist in the conventional binary scale, conductors are always passed through a core in the same sense to represent a digit of value 1. To that extent, the use of the binary scale simplifies the lacing technique. Numbers greater than 15 can of course be synthesised by using more cores, representing higher order binary digital places.

The application of the invention illustrated in Figure 2 is adapted to evaluate a function of an independent variable, say $f(x)$, for any value of the independent variable $x$ within given limits, the apparatus including means for storing values of the function and of derivatives thereof for successive discrete values of the variable and making use of the Taylor expansion to interpolate values of the function for arbitrary values of the variable intermediate said discrete values. The apparatus comprises a magnetic core 19 of toroidal form on which a winding 20 is disposed having say 100 turns and having 10 equally spaced taps 21 . . . 30. For convenience of illustration the core is merely shown diagrammatically while only 10 turns are shown on the winding 19. The winding 20 is connected across a source of alternating reference voltage 31, the lower end of the winding 20 being earthed as shown. The winding 20 is utilised to provide the major contribution to each function value which it is required to store, since a voltage whose amplitude represents, to within ±5 percent, any desired value of $f(x)$ can be obtained between one or other of the taps 21 . . . 30 and earth. A plurality of conductors $a_1$ . . . $a_n$, $a_{n+1}$ . . . $a_r$ are each connected at one end to one of the taps 21 . . . 30 on the winding 20 and these conductors are connected respectively at their other ends to a series of equi-spaced switch contacts $b_1$ . . . $b_n$, $b_{n+1}$ . . . $b_r$. Each conductor and each switch contact corresponds to a particular value of $x$ for which a value of $f(x)$ is stored in the apparatus, the intervals between successive values of $x$ for which $f(x)$ is stored being constant and denoted herein by $\Delta x$. This interval is represented specially in the apparatus by the distance between centres of adjacent contacts $b_1 \ldots b_r$, and at their left hand ends the conductors are connected to the tap on the winding 20 which most nearly represents the particular value of $f(x)$ for the value of $x$ appropriate to the conductor. The number of conductors may be quite large, say of the order of one or two hundred, and more than one conductor will in general be connected to each of the taps 21 . . . 30 on the winding 20. A contact brush 32 is movable to engage selectively the contacts $b_1 \ldots b_r$ and it is connected by a load impedance 33 to ground whereby a conductive loop is completed by the load 33 and the particular conductor corresponding to the contact engaged by the brush 32. The contacts $b_1 \ldots b_r$ although shown for convenience arranged in a straight line are preferably disposed in a circle, in which case the brush 32 is carried on a rotary arm and one revolution of the brush 32 represents the range of $x$ over which $f(x)$ can be evaluated by the apparatus. The brush 32 is arranged to be operated so that its angular displacement represents the independent variable $x$, the position of the brush 32 at any instant being representative of the instantaneous value of $x$ and as will hereinafter appear a voltage is set up across the impedance 33 which for any position of the brush 32 is the analogue of $f(x)$ at the corresponding value of $x$. The brush 32 is of the make-before-break type so that on movement from one contact to another it engages the succeeding contact before disengaging the preceding one. The contacts $b_1 \ldots b_r$ and the brush 32 are such that the brush on moving sequentially over the contacts $b_1 \ldots b_r$ remains in engagement with each contact through a small range of positions of the brush representing a variation of $x$ in the interval from $-\Delta x/2$ to $+\Delta x/2$ centred on the value of $x$ represented by the respective constant.

From the tap on the winding 20 at which it originates each conductor $a_1 \ldots a_r$ passes to a first series of seven toroidal cores 34 . . . 40. The first core 34 is excited by a winding 41 connected across the voltage source supply 31 and each succeeding core 35 . . . 40 is excited by means of windings 42 . . . 48 with one third of the flux with which the preceding core is excited, in the manner described with reference to Figure 1, the cores being used to induce electro-motive forces in the conductors $a_1 \ldots a_r$ representing seven symmetric ternary digits of lower power than the decimal digit, these electro-motive forces being added to those contributed to the respective conductors by the winding 20. Thus each of the conductors $a_1 \ldots a_r$ is laced through or past the cores 34 . . . 40 in such a way that the resultant electro-motive force set up between each contact $b_1 \ldots b_r$ and earth due to the winding 20 and the windings 41 . . . 48 represents a particular value of $f(x)$, evaluated to the number of significant digits possible by using one decimal digit and seven symmetric ternary digits of progressively decreasing power, namely approximately four significant decimal digits. It is convenient to regard the conductors as "storing" different values of $f(x)$ for the discrete values of $x$, the conductor $a_1$ storing the value of $f(x)$ for $x=x_1$, the conductor $a_n$ storing the value of $f(x)$ for $x=x_n$ and so on. The interval between the particular values of $x$ for which $f(x)$ is stored by the conductors $a_1 \ldots a_n$ is as aforesaid constant and equal to $\Delta x$.

From the cores 34 . . . 40 the conductors $a_1 \ldots a_n$ pass to either a series of seven cores 49 . . . 55 or a series of seven similar cores which are not shown individually but are collectively indicated by numeral 56. The cores 49 . . . 55 are provided with ternary digit windings 57 . . . 63 similar to the windings 41 . . . 48. The odd numbered conductors $a_1, a_3 \ldots$ etc. are laced through or past the cores in the series 49 . . . 55 in such a way that if a voltage is applied across the winding 57, i. e., the winding of highest power in the series 57 . . . 63, there is added to the value of $f(x)$ stored by each of the odd numbered conductors, the value of $f'(x)$ (i. e., the first derivative of $f(x)$) at the particular value of $x$ appropriate to the conductor, multiplied by a co-efficient $k_1$ which is linearly dependent upon the amplitude of the voltage applied to the winding 57. The odd numbered conductors pass the series of cores 56 without any magnetic coupling thereto. The even numbered conductors $a_2, a_4 \ldots$ etc. pass the cores 49 . . . 55 without any magnetic coupling therewith, but are laced through or past the cores of the series 56 so as to store in the even numbered conductors values of $f'(x)$ for the corresponding particular values of $x$, multiplied by a co-efficient $k_2$ which is linearly dependent upon the voltage applied to the highest power winding of the series 56. The voltage applied to winding 57 is derived from a variable autotransformer 64, the winding 57 being connected between earth and a contact brush 65 movable to engage successively a plurality of fixed contacts on the transformer 64. The voltage applied to the highest order winding of the series 56 is also derived from the autotransformer 64, being that set up between earth and another contact brush 66. The autotransformer 64 is connected across a secondary winding 67 magnetically coupled to the winding 20, the winding 67 being earthed at its midpoint as shown. The fixed contacts of the autotransformer 64 are arranged in an arc of angular extent slightly exceeding 180° and the brushes 65 and 66 are provided on the opposite ends of a diametric arm 68. The arm 68 is driven from the brush 32 through a suitable transmission indicated by the dotted line 69 and the arrangement is such that the arm 68 completes one half counter clockwise revolution when the brush 32 is moved the distance between centres of two adjacent contacts $b_1 \ldots b_r$. The brush 65 is at the midpoint of the autotransformer 64 (which is earthed) when the brush 32 is at the midpoint of an odd numbered contact $b_1, b_3 \ldots$ etc. and similarly the brush 66 is at the midpoint of the autotransformer when the contact 32 is at the midpoint of an even numbered contact $b_2, b_4 \ldots$ etc. The angular displacement of the arm 68 and therefore the voltage set up at the brush 65 or 66 (as the case may be) represents what may be termed the independent increment, that is difference between the instantaneous value of $x$ and the nearest discrete value represented by one of the contacts $b_1 \ldots b_r$. One half revolution of the arm represents a variation of $\Delta x$ in the independent increment, the independent increment being zero when the brush 65 or 66 is at the midpoint of the autotransformer 64. In the drawing the brush 32 is shown engaging the contact $b_n$ ($n$ being assumed to be an odd number), and as the brush 32 moves through the range of positions in which it remains in engagement with the contact $b_n$, the rotation of the arm 68 causes the brush 65 to feed to the winding 57 a variable voltage such that the aforesaid co-efficient $k_1$ varies progressively from a minimum value $-\Delta x/2$ through zero to a maximum value $+\Delta x/2$, $\Delta x$ being as aforesaid equal to the difference between two successive discrete values of $x$ represented by the conductors $a_1 \ldots a_r$. The means for rotating the brushes 65 and 66 thus constitute means for or multiplying the amplitudes of the flux variations in the series of cores 49 to 55 and the series of cores 56 to the difference between the instantaneous value of $x$, as represented by the position of the brush 32 and the discrete value of $x$ represented by the corresponding contact of the series $b_1 \ldots b_r$. If the brush 32 is now moved into engagement with the contact $b_{n+1}$, at the instant when it is in engagement with both the contacts $b_n$ and $b_{n+1}$ the brushes 65 and 66 are in engagement with contacts at opposite ends of the autotransformer 64, so that at the instant when the co-efficient $k$ is caused to be equal to $\Delta x/2$, the aforesaid co-efficient $k_2$ is caused to be equal to $-\Delta x/2$. The brush 65 then moves out of engagement with the fixed contacts of the autotransformer 64 as the brush 32 moves out of engagement with the contact $b_n$, and as the contact 32 moves through the range of positions in which it remains in contact with $b_{n+1}$, the movement of the brush 65 causes $k_2$ to vary in the interval $-\Delta x/2$, $+\Delta x/2$. Since the second term of the Taylor expansion for a given function is less important than the first term no decimal digit is utilised in evaluating the particular values $f'(x)$ which are stored by the conductors, the seven symmetric ternary digits being approximately equivalent to three decimal digits.

From the cores 49 . . . 55 the odd numbered conductors $a_1$, $a_3$ . . . etc. pass to a further series of toroidal cores indicated collectively by the numeral 70. The series of cores 70 add to the electro-motive forces stored by each odd numbered conductor, an electro-motive force representing a co-efficient $m_1$ multiplied by $f''(x)/2$ at the particular value of $x$ appropriate to the conductor, $f''(x)$ symbolising the second derivative of $f(x)$. The numerical value of the factor $f''(x)/2$ in the case of each conductor is set up by the order of lacing the corresponding conductor through or past the series of cores 70, whilst the factor $m_1$ is determined by the exciting voltage, in the manner analogous to that described for setting up $k_1 f'(x)$. The winding of highest power for the cores of the series 70 has an exciting voltage applied from the movable contact brush 71 of an autotransformer 72 similar to the transformer 64. The brush 71 is driven by the transmission 69 in synchronism with the brush 65 and the transformer 72 is excited by the voltage set up between the brush 65 and earth. The arrangement is thus such that $m_1$ is equal to $(k_1)^2$. The even numbered conductors from the series of cores 56 pass to a series of toroidal cores 73 the winding of highest power for which is excited by the voltage set up between earth and the contact brush 74 of a further autotransformer 75 similar to 64. The brush 74 is driven by the transmission 69 in synchronism with the brush 66 and the transformer 75 is excited by the voltage set up between the brush 66 and earth. The cores 73 are arranged to add to the voltage stored by each even numbered conductor a voltage representing $(k_2)^2 f''(x)/2$. Each of the series 70 and 73 may consist of four cores, since the importance of the third term of the Taylor expansion is small compared with the second term.

It will now be apparent that when the brush 32 engages the contact $b_n$, say, the voltage set up across the load 33 equals $$f(x)_n + k_1 f'(x)_n + (k_1)^2 f''(x)_n/2$$

the first three terms of the Taylor expansion for the value of $f(x_n+k)$. The aforesaid interval interval $\Delta x$, which is greater than or equal to $2k$, is so chosen that the voltage set up across 33 may be taken as representative of $f(x_n+k)$ without the error which is introduced by neglecting the higher order terms of the Taylor expansion exceeding the error which can be tolerated in practice. Moreover as the brush moves through the range of positions in which it remains in engagement with $b_n$, the co-efficient $k_1$ varies through the range from $-\Delta x/2$ to $+\Delta x/2$, and therefore the voltage set up across the load 33 varies from $f(x_n-\Delta x/2)$ to $f(x_n+\Delta x/2)$. Likewise when the brush 32 moves through the range of positions in which it remains in engagement with the contact $b_{n+1}$, the value of the voltage set up across 33 varies from $f(x_{n+1}-\Delta x/2)$ to $f(x_{n+1}+\Delta x/2)$ as $k_2$ varies from $-\Delta x/2$ to $+\Delta x/2$. When the brush 32 simultaneously engages both contacts $b_n$ and $b_{n+1}$, the voltage across the load 33 is the mean of two nominally equal voltages. From the foregoing it follows that as the brush 32 moves progressively from the contact $b_1$ to the contact $b_r$ the voltage across 33 varies continuously in a smooth manner through the values which $f(x)$ may take as $x$ varies as represented by the movement of 32.

The arrangement shown in Figure 2, in addition to illustrating a practical application of the principle described with reference to Figure 1, illustrates an advantageous method of interpolating between discrete values of $f(x)$ when the independent variable takes values intermediate the corresponding discrete values of $x$. It will be observed that the dependent increment required for interpolation, that is the terms in $f'(x)$ and $f''(x)$, is injected into the conductors $a \ldots a_r$ between the points at which the analogues of $f(x)$ are set and the contacts $b_1 \ldots b_r$. This has the advantage that only one set of contacts such as $b_1 \ldots b_r$, and one selector brush 32 are required, since the voltages available at the contacts $b_1 \ldots b_r$ are already interpolated; moreover the brush 32 on sliding over the contacts $b_1 \ldots b_r$ does not experience any discontinuity of voltage as it changes from one contact to the next. This result is readily achieved by adopting the principle described with reference to Figure 1 for setting up the analogues of $f'(x)$ and $f''(x)$ since the introduction of the independent increment can be effected by autotransformers whose brushes (65, 66, 71 and 74) move in dependence upon the difference between the instantaneous value of $x$ and the nearest discrete value for which a value of $f(x)$ is stored.

Duplicate units for setting up the interpolation co-efficient $f'(x)$ and $f''(x)$ are provided as indicated since some overhang is desirable when the brush 32 changes from one contact to the next, so that the timing of the brush 32 is not too critical. That is to say, for a short interval on either side of the time when the brush 32 should change over from one contact to another, say from the contact $b_n$ to the contact $b_{n+1}$, the required output is available at both the contacts, so that slight inaccuracy in the change over time does not cause discontinuity. To achieve this result, it is necessary during the overhang interval to multiply the interpolation co-efficients $f'(x)$ and $f''(x)$ injected into alternate conductors (distinguished in the foregoing description as odd numbered conductors and even numbered conductors respectively) by different independent increments $k_1$ and $k_2$.

The function which can be evaluated by the apparatus illustrated in Figure 2 has been referred to generally as $f(x)$ but it may be any arbitrary function of an independent variable.

Moreover while the invention has been described with reference to functions of one variable, it can be extended to functions of more than one variable. Other modifications may also be made to the apparatus described. For example the winding 20 may be replaced by a winding having one hundred taps and the first series of the cores utilised for adding symmetric ternary digits can be reduced to five in number, the first ternary digit winding having for example 300 turns and having applied to it the full reference voltage. The voltage contributions obtainable from the winding with one hundred taps and from the series of five ternary digit windings represent, in this case, a number having one centenary digit and five symmetric ternary digits. Moreover means for setting up voltage contributions representing the third term of the Taylor expansion may in some cases be omitted, whereas in other cases higher order terms may be included.

What we claim is:

1. Apparatus for setting up electrical analogues of numbers, comprising a series of magnetizable cores, energizing windings on said cores, means for feeding alternating current to said windings to induce flux variations in the successive cores having successively greater amplitudes related as successive integral powers of two, and a plurality of conductors electro-magnetically linked with different combinations of said cores, each conductor being linked once only with any core, to induce in the respective conductors electro-motive forces representative of different numbers.

2. Apparatus for setting up electrical analogues of numbers, comprising a series of magnetizable cores, means for inducing flux variations in the successive cores having amplitudes related as successive integral powers of three, and a plurality of conductors electro-magnetically linked with different combinations of said cores, each conductor being linked with a selected polarity and once only with any core, each combination of cores and the polarity of the linkages being predetermined to induce electro-motive forces in the respective conductors representative of different numbers expressed in a ternary scale of notation with the digits +1, 0, and −1 available in each digital place.

3. Apparatus for setting up electrical analogues of numbers, comprising a series of magnetizable cores of closed configuration, energizing windings on said cores, means for feeding alternating current to said windings to induce flux variations in the successive cores having successively greater amplitudes related as successive integral powers of two, a plurality of conductors electro-magnetically linked with selected combinations of said cores, each conductor being linked once only with any core, to induce in the respective conductors electro-motive forces representative of different numbers, an output load, and selector means for switching the output load between the ends of a selected one of said conductors to set up a voltage across said load proportioned to the corresponding electro-motive force.

4. Apparatus for setting up electrical analogues of numbers, comprising a series of magnetizable cores of closed configuration, means for inducing flux variations in the successive cores having amplitudes related as successive integral powers of three, a plurality of conductors passing through selected combinations of said cores, each conductor passing in a selected sense and once only through any core, each combination of cores and the sense in which the respective conductor passes therethrough being predetermined to induce an electro-motive force in each conductor representative of a desired number, an output load, and selector means for switching said output load between the ends of a selected one of said conductors to set up a voltage across said load proportioned to the corresponding electro-motive force.

5. Apparatus for setting up electrical analogues of numbers comprising a series of magnetizable cores, energizing windings on said cores, means for feeding alternating current to said windings, said windings and the current fed thereto being predetermined to induce flux variations in the successive cores having amplitudes related as successive integral powers of three, a plurality of conductors electro-magnetically linked with different combinations of said cores, each conductor being linked with a selected polarity and once only with any core, each combination of cores and the polarity of the linkages being predetermined to induce electro-motive forces in the respective conductors representative of different numbers, and means for simultaneously multiplying the current in all said windings by the same factor to multiply the induced electro-motive forces by said factor.

6. Apparatus for evaluating arbitrary values of a function, comprising a series of conductors to which are assigned successive discrete values of the variable of said function separated by the same interval, means for inducing in said conductors electro-motive forces representative of the values of the function for the assigned values of the variable, means for inducing in said conductors further electro-motive forces representative of the values of the first derivative of the function for the assigned values of the variable, means for proportioning said further electro-motive forces to the difference between an intermediate value of said variable and a selected one of said discrete values, an output load, and selector means for applying the resultant electro-motive force in a selected conductor to said load to set up a voltage across said load approximately representative of the value of the function for said intermediate value of the variable.

7. Apparatus for evaluating arbitrary values of a function, comprising a series of conductors to which are assigned successive discrete values of the variable of said function separated by the same interval, means for inducing in said conductors electro-motive forces representative of the value of the function for the assigned values of the variable, a plurality of magnetic cores of closed configuration, means for inducing flux variations in the successive cores having amplitudes related as integral powers of three, each of said conductors passing through a selected combination of said cores, each conductor passing in a selected sense and once only through any core, each combination of cores and the sense in which the conductor passes therethrough being predetermined to induce in the respective conductors electro-motive forces representative of the values of the first derivative of the function for the assigned values of the variable, means for simultaneously proportioning the amplitudes of flux variations in the cores to the difference between an intermediate value of said variable and a selected one of said discrete values, an output load, and selector means for applying the resultant electro-motive force in a selected conductor to said load to set up a voltage across said load approximately representative of the value of the function for said intermediate value of the variable.

8. Apparatus for setting up electrical signals representative of different numbers, comprising means for setting up a series of electrical signals to which are assigned different digital values, a plurality of signal carriers coupling different combinations of said means to the respective signal carriers with a selected polarity, an output load, and selector means for feeding signals from a selected carrier to said load.

9. Apparatus for evaluating a function comprising an array of contacts disposed to represent equi-spaced discrete values of the variable of the function, a contact brush movable to scan said contact array and represent the variable of the function, said contacts and said brush being dimensioned to cause said brush to engage each successive contact through a range of displacements of the brush representing the interval between said discrete values, means for applying to each contact a first electro-motive force representing the value of the function for the value of the variable represented by the respective contact, a transformer, means for energizing the primary turns of said transformer with a voltage fixed amplitude, means connected to move with said brush to vary the transformation ratio of said transformer proportionally to the difference between the value of the variable represented by the brush and the discrete value of the variable represented by the contact engaged by the brush, injector means for feeding to the engaged contact, in series with said first electro-motive force, a second electro-motive force proportional to the first derivative of said function for the respective discrete value of the variable, said injector means being energised by the output of the secondary turns of said transformer whereby each second electro-motive force represents the product of said derivative and said difference.

10. Apparatus for evaluating arbitrary values of a function, comprising a series of conductors to which are assigned successive discrete values of the variable of said function separated by the same interval, means for inducing in said conductors electro-motive forces representative of the value of the function for the assigned values of the variable, means for inducing in said conductors further electro-motive forces representative of the values of the first derivative of the function for the assigned values of the variable, a transformer, means for energizing the primary turns of said transformer with a voltage of fixed amplitude, means for varying the transformation ratio of said transformer to represent the difference between an intermediate value of said variable and a selected one of said discrete values, said means for inducing said further electro-motive forces being energized by the output of the secondary turns of said transformer to cause said further electro-motive forces to be proportioned to said difference, an output load, and selector means for applying the resultant electro-motive force in a selected conductor to said load to set up a voltage across said load approximately representative of the value of the function for said intermediate value of the variable.

11. Apparatus for evaluating a function comprising an array of contacts disposed to represent equi-spaced discrete values of the variable of the function, a make-before-break contact brush movable to scan said contact array and represent the variable of the function, said contacts and said brush being dimensioned to cause said brush to engage each successive contact through a range of displacements of the brush representing the interval between said discrete values, means for applying to each contact a first electromotive force representing the value of the function for the value of the variable represented by the respective contact, a transformer, means for energizing the primary turns of said transformer with a voltage of fixed amplitude, means for deriving two output signals from said transformer, means connected to move with said brush to vary the transformation ratio of said transformer to proportion the first and second output signals respectively to the difference between the value of the variable represented by the brush and the discrete value of the variable represented by alternate contacts, when engaged by the brush, first injector means for feeding to each second contact, in series with the first electromotive force, a second electromotive force proportional to the first derivative of said function for the discrete value of the variable represented by the respective contact, said injector means being energised by said first transformer output to proportion the second electromotive forces to said first output, second injector means for feeding to each intermediate contact, in series with the first electromotive force, a second electromotive force proportional to the first derivative of said function for the discrete value of the variable represented by the respective contact, said second injector means being energised by said second transformer output to proportion the respective second electromotive forces to said second output.

12. Apparatus for synthesising voltage analogues comprising an inductive impedance, means for applying an alternating voltage across said impedance, a plurality of leads tapped to said impedance at points yielding voltages approximately proportional to desired fractions of the applied voltage amplitude, individual transformer secondary windings in said leads, and transformer primary means for inducing electromotive forces across said secondary windings, said secondary windings being predetermined to add incremental voltages to the voltages at the respective tapping points to produce resultant voltages more accurately representing said fractions.

13. Apparatus for synthesising voltage analogues comprising an inductive impedance, means for applying an alternating voltage across said impedance, a plurality of leads tapped to said impedance at points yielding voltages approximately proportional to desired fractions of the applied voltage amplitude, individual transformer secondary windings in said leads, and a transformer primary winding coupled to all said secondary windings for inducing electromotive forces across said secondary windings, means for varying the energising current of said primary winding to vary said electromotive forces, said secondary and primary windings being predetermined to add incremental voltages to the voltages at the respective tapping points to produce resultant voltages having amplitudes between the amplitudes of the voltages at the tapping points.

14. Apparatus according to claim 12 comprising an output load, and selector means for selectively applying the resultant voltages to said output load.

15. Apparatus for evaluating a function comprising an array of contacts disposed to represent equi-spaced discrete values of the variable of the function, a contact brush movable to scan said contact array and represent the variable of the function, said contacts and said brush being predetermined to cause engagement of the brush with each successive contact through a range of brush displacements representing an interval equal to that between said discrete values, means for applying to each contact a first electromotive force representing the value of the function for the value of the first variable represented by the corresponding contact, variable ratio transformer means coupled to said brush to set up an output voltage proportional to the difference between the value of the variable represented by said brush and the discrete value of the variable represented by the contact engaged by said brush, injector means energised by said transformer means for feeding to said engaged contact in series with said first electromotive force a second electromotive force proportional to the product of said difference and the first derivative of the function for the corresponding discrete value of the variable, and second variable ratio transformer means coupled to said brush to set up an output voltage proportional to the square of said difference, further injector means energised by said second transformer means for feeding to said engaged contact in series with the first and second electromotive forces, a third electromotive force proportional to the product of said square and the second derivative of the function for the corresponding discrete value of the variable, whereby the voltage derived by said brush approximately represents the value of the function.

16. Apparatus according to claim 15, said second variable ratio transformer means comprising a transformer having its primary turns energised by the output of said first variable ratio transformer means and having its transformation ratio variable in response to movement of said brush.

17. Apparatus for evaluating arbitrary values of a function comprising a series of conductors to which are assigned successive discrete values of the variable of said function separated by the same interval, means for inducing in said conductors first electromotive forces representative of the values of the function for the assigned values of the variable, means for inducing in said conductors second electromotive forces representative of numerical quantities which have as factors the values of the first derivative of the function for the assigned values of the variable, means for inducing in said conductors third electromotive forces representative of numerical quantities which have as factors values of the second derivative of the function for the assigned values of the variable, means for varying said second and third electromotive forces in dependence on the difference between an arbitrary value of said variable and a selected discrete value, an output load, and selector means for applying the resultant electromotive force in the conductor corresponding to said selected discrete value to said load to set up a voltage across said load, said means for varying second and third electromotive forces being predetermined to cause said resultant electromotive force to represent approximately the value of the function for said arbitrary value of the variable.

18. Apparatus for setting up electrical analogues of numbers, comprising a series of magnetizable cores, energizing windings on said cores, means for feeding alternating current to said windings to induce flux variations in the successive cores having successively greater amplitudes related as succesive integral powers of three, and a plurality of conductors electromagnetically linked with different combinations of said cores, each conductor being linked once only with any core, to induce in the respective conductors electromotive forces representative of different numbers.

19. Apparatus for setting up electrical analogues of numbers comprising a series of magnetizable cores, energizing windings on said cores, means for feeding alternating current to said windings, said windings and the current fed thereto being predetermined to induce flux variations in the successive cores having amplitudes related as successive integral powers of two, a plurality of conductors electromagnetically linked with different combinations of said cores, each conductor being linked with a predetermined polarity and once only with any core, each combination of cores and the polarity of the linkages being predetermined to induce electromotive forces in the respective conductors representative of different numbers, and means for simultaneously multiplying the current in all said windings by the same factor to multiply the induced electromotive forces by said factor.

20. Apparatus for evaluating arbitrary values of a function, comprising a series of conductors to which are assigned successive discrete values of the variable of said function separated by the same interval, means for inducing in said conductors electromotive forces representative of the value of the function for the assigned values of the variable, a plurality of magnetic cores of closed configuration, means for inducing flux variations in the successive cores having amplitudes related as integral powers of two, each of said conductors passing through a selected combination of said cores, each conductor passing in a predetermined sense and once only through any core, each combination of cores and the sense in which the conductor passes therethrough being predetermined to induce in the respective conductors electromotive forces representative of the values of the first derivative of the function for the assigned values of the variable, means for simultaneously proportioning the amplitudes of flux variations in the cores to the difference between and intermediate value of said variable and a selected one of said discrete values, an output load, and selector means for applying the resultant electromotive force in a selected conductor to said load to set up a voltage across said load approximately representative of the value of the function for said intermediate value of the variable.

References Cited in the file of this patent

UNITED STATES PATENTS

| | | |
|---|---|---|
| 2,227,498 | Hibbard | Jan. 7, 1941 |
| 2,258,259 | Ogden | Oct. 7, 1941 |